United States Patent
Green et al.

(10) Patent No.: US 7,013,551 B2
(45) Date of Patent: Mar. 21, 2006

(54) METHOD OR MANUFACTURING THIN WALL ISOGRID CASINGS

(75) Inventors: Richard Green, Bristol (GB); Peter Shore, Bristol (GB)

(73) Assignee: Roll-Royce plc, London (GB)

( * ) Notice: Subject to any disclaimer, the term of this patent is extended or adjusted under 35 U.S.C. 154(b) by 324 days.

(21) Appl. No.: 10/412,322

(22) Filed: Apr. 14, 2003

(65) Prior Publication Data
US 2004/0025338 A1    Feb. 12, 2004

(30) Foreign Application Priority Data
Apr. 22, 2002  (GB) .................................. 0209113

(51) Int. Cl.
*B23P 17/00* (2006.01)
(52) U.S. Cl. ............................ 29/559; 29/558; 29/888; 29/888.01; 29/897; 29/897.2; 29/897.31; 29/897.32; 60/766; 409/219; 269/289 R
(58) Field of Classification Search ................. 29/557, 29/558, 897, 897.2, 897.31, 897.32, 888, 29/888.01, 888.012, 559; 244/119; 52/82, 52/548.1; 415/196; 409/219; 269/289 R; 60/766
See application file for complete search history.

(56) References Cited

U.S. PATENT DOCUMENTS

| | | | |
|---|---|---|---|
| 3,940,891 A | | 3/1976 | Slysh |
| 4,012,549 A | * | 3/1977 | Slysh .......................... 428/116 |
| 4,801,070 A | * | 1/1989 | Hom et al. .................. 228/184 |
| 5,079,821 A | * | 1/1992 | Parsons ....................... 29/424 |
| 5,122,242 A | | 6/1992 | Slysh |
| 5,139,245 A | * | 8/1992 | Bruns et al. .................. 269/21 |
| 5,485,723 A | | 1/1996 | McCoy et al. |
| 5,704,824 A | * | 1/1998 | Hashish et al. ............... 451/36 |
| 6,352,496 B1 | * | 3/2002 | Oldani ........................ 483/55 |
| 6,415,694 B1 | | 7/2002 | Sogoian |
| 6,543,991 B1 | * | 4/2003 | Sathianathan et al. ......... 415/9 |

FOREIGN PATENT DOCUMENTS

| | | |
|---|---|---|
| DE | 280 924 A1 | 7/1990 |
| GB | 2 071 535 A | 9/1981 |
| GB | 2 124 111 A | 2/1984 |
| RU | 1323236 A1 | 7/1987 |

* cited by examiner

*Primary Examiner*—Eric Compton
(74) *Attorney, Agent, or Firm*—Oliff & Berridge, plc

(57) ABSTRACT

In one aspect of the invention a method of manufacturing a thin wall isogrid casing by a chip machining process comprises the steps of: positioning a substantially cylindrical casing (10) on a support (20); the support having a substantially continuous cylindrical support surface (22) engaging at least part of the inner or outer surface of the casing; and machining a plurality of recessed pockets in the said inner or outer surface of the casing opposite the surface engaged by the said support; whereby the support reacts loads acting on the casing by the chip machining tool during machining to minimise distortion of the casing and tearing of the pockets being formed. With this method isogrid pockets (14) can be chip machined, by drilling and/or milling etc, with pocket wall thicknesses of less that 1 mm.

13 Claims, 2 Drawing Sheets

METHOD OR MANUFACTURING THIN WALL ISOGRID CASINGS

BACKGROUND

This invention relates to isogrid casing structures, and in particular to a method of manufacturing thin-walled isogrid casings by chip machining processes.

Isogrids are used for reinforcing thin-wall components such as gas turbine engine casings or for forming lightweight lattice type structures, for example for use in space vehicle applications. An isogrid is a structure which comprises a triangular pattern of ribs arranged in rows of equal sided triangles. Isogrids are used to increase the stiffness of thin-wall structures while minimising weight. Isogrids have found particular application in gas turbine aero engine applications where thin-wall engine casing ducts are reinforced with isogrids to provide additional stiffness for supporting ancillary units and components.

One method of manufacturing an isogrid cylindrical casing type structure is described in U.S. Pat. No. 3,940,891 in which a frusto-conical structure having an isogrid reinforcement on its internal surface is formed from a plurality of substantially identical panels. Each panel is manufactured from a metal plate having the thickness of the panel to be formed. The metal plate is positioned in a numerical controlled milling machine and the material between the ribs is milled away to form triangular pockets. NC milling can be used to reduce the wall thickness of the pockets to 1 mm and where wall thicknesses of less than 1 mm are required the pockets are further machined by chemical milling to the final desired thickness. Webs, flanges and other features are protected by masking during the chemical milling process. When machining is complete, the panel is rolled or formed by other means to its desired shape. The panels are secured together to produce the conical casing structure.

A method of chemically machining isogrid casings is described in U.S. Pat. No. 5,122,242 where it is mentioned that chemical machining can be used for producing pocket wall thicknesses and rib widths to a minimum of 0.5 mm.

In chemical machining metal removal is achieved by a reverse electro plating process which produces a metal hydroxide of the metal being removed suspended as an emulsion in the electrolytic solution. Removal and disposal of the metal hydroxide emulsion is both hazardous and expensive and this combined with other factors results in significant additional cost to the machined casing.

U.S. Pat. No. 5,485,723 discloses a cylindrical isogrid fan containment case for a gas turbine aero engine in which a mill type cutting tool is used to remove material from the pockets of the isogrid being formed. In this document a first tool is used to remove material to the desired pocket wall thickness and a second tool is used to mill around the periphery of the pocket so formed. In this document the pockets have a wall thickness of between 2.03 mm and 5.72 mm.

SUMMARY

Hitherto it has not been possible to manufacture isogrid reinforced casings where the pocket wall thickness is less than 1 mm other than by chemical machining. The minimum pocket wall thickness achievable with NC controlled mill cutters and the like has been limited by distortion of the casing due to cutter induced stresses resulting in rupture and tearing of the thin wall pocket sections.

There is a requirement therefore for a method of producing thin wall section isogrid reinforced casings which avoids the use of hazardous chemicals, as in chemical machining, yet readily enables pocket wall thicknesses of 1 mm or less to be achieved without rupture or damage to the isogrid due to induced machining stresses.

According to an aspect of the invention there is a method of manufacturing a thin wall isogrid casing by a chip machining process; the said method comprising the steps of:

positioning a substantially cylindrical casing on a support; the said support having a substantially continuous cylindrical support surface engaging at least part of the inner or outer surface of the casing;

machining a plurality of recessed pockets in the said inner or outer surface of the casing opposite the surface engaged by the said support; whereby the support reacts loads acting on the casing during machining thereof to minimise distortion of the casing and tearing of the pockets being formed.

The support readily enables the machining induced stresses to be supported by engagement of the casing with the support on the opposite side of the casing to that being machined. In this way the casing is sandwiched between the support and the stress inducing chip machining tool. This can prevent relative movement of the casing with respect to the chip machining tool. This can also prevent distortion of the casing and tearing and rupture of the pockets by the tool. The support can reduce the likelihood of distortion of the cylindrical casing, for example, buckling due to relatively high induced machining loads acting on the casing during machining.

Preferably, the method further comprises the step of introducing a filler material between the casing and the support. The filler material can readily fill gaps that occur between the casing and the support due to geometric differences between the casing and support, for example due to manufacturing tolerances resulting in slightly oval casing cross sections. The filler material provides support for the casing in regions where a gap would otherwise be formed so that the filler material can readily support the loads acting on the casing during chip machining. This enables thin wall section pockets to be readily machined without damaging the pockets being formed, for example by the chip machining tool tearing the thin wall radial sections of the pockets which would otherwise occur without adequate support. The use of a filler material between the casing and the support is particularly advantageous when the casing is fabricated from a plurality of appropriately shaped metal plates. A typical welded casing can be up to 4 mm oval and local geometric distortions can be present around the weld lines. The affects of these geometric variations can be accommodated by the filler material between the casing and the support.

Preferably, the filler material is a curable resin. In this way the resin can be applied to the support surface of the support or the casing or both and cured in-situ when the casing is positioned on the support so that the uncured resin can readily flow between the support and the casing into regions where gaps may be present. This ensures that the casing is fully supported by the cured resin and the support. In preferred embodiments, the resin is an epoxy resin and is injected between the casing and the support. In one embodiment, the casing is a fabricated frusto-conical casing and the support has a correspondingly frusto-conical support surface for engaging the casing.

In another embodiment the casing is a forged frusto-conical casing. When the casing is machined from a forging using an NC controlled chip machining tool the frusto-conical casing can be accurately machined to within very close tolerance limits so that the casing may be directly mounted on the support without the curable resin or filler material previously described.

Preferably, the support surface engages substantially the whole of the inner or outer surface of the casing. This provides for maximum support so that the casing is fully supported with respect to the support. In this way the recessed pockets may be machined over the entire surface of the casing in a single machining operation, that is to say without repositioning the casing with respect to the support.

In preferred embodiments, the casing is machined on its radially outer surface and supported by the support on its radially inner surface. This is particularly advantageous in the embodiment where the casing comprises an engine casing and gas flow duct for a gas turbine engine since the pockets and reinforcing ribs are formed on the outer or external side of the casing with the inner surface providing a substantially smooth surface for gas flow through the engine. By machining the radially outer surface the casing can be readily supported on a support in the interior of the casing which reduces the amount of space required for machining in comparison with embodiments where the casing is supported on its outer surface and the ribs and pockets of the isogrid are machined on the inner surface. Machining the radially outer surface of the casing also more readily provides for visual inspection of the casing during machining.

Preferably the pockets are machined to have a radial thickness of less than 1 mm and in preferred embodiments the pockets are machined to have a radial thickness substantially in the range 0.45 mm to 0.85 mm. This is possible with the method of the above mentioned aspect of the invention when using a chip machining process since the thin wall sections (0.45 mm to 0.85 mm) are readily supported by the support during machining.

Preferably, the pockets are machined by and NC controlled milling cutter and/or spot drill. By using an NC controlled tool accurate and re-producable isogrids can be readily machined on the surface of the casing.

In preferred embodiments the pockets are first machined by spot drilling and then by a mill cutter. In this way the bulk of the material to be removed can be removed by means of a spot drill which drills to near the required depth, that is to say to provide the required radial wall thickness of the pockets. The pockets can then be finish machined by milling with or without an in-process measurement step being implemented between the spot drilling and milling steps.

The method preferably further comprises the step of determining dimensional distortions in the casing before machining the pockets, and adjusting positional control parameters of the NC controlled tool in accordance with the measured distortions. An initial dimension check is particularly important where fabricated casings are to be machined.

In preferred embodiments the method further comprises the step of inspecting the dimensions of the pockets during machining. As has been mentioned this can involve the step of gauging the thickness of each or a sample of pockets following spot drilling so that the thickness gauge data so determined can be used to adjust NC control parameters for subsequent finish milling. This is particularly useful when the casing being machined has been fabricated by welding since variations in the actual wall thickness can more readily occur following the initial spot drilling step.

According to another aspect of the invention there is provided an isogrid structure manufactured according to the aforementioned method.

BRIEF DESCRIPTION OF THE DRAWINGS

According to a further aspect of the invention there is provided a gas turbine engine casing having an isogrid structure manufactured according to the method of the above first mentioned aspect.

Various embodiments of the invention will now be more particularly described, by way of example, with reference to the accompanying drawings, in which.

DETAILED DESCRIPTION OF EMBODIMENTS

Figure 1:
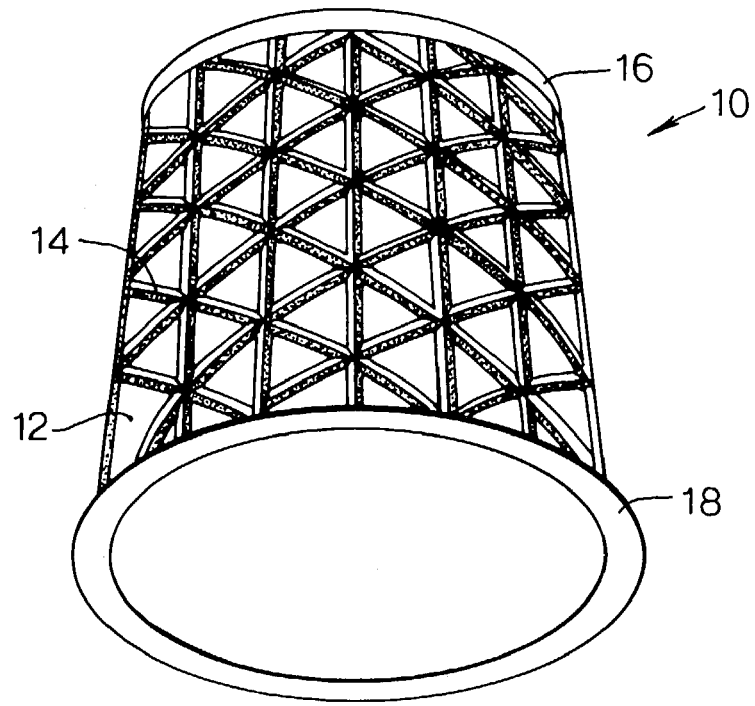
FIG. 1 is a perspective view of a gas turbine engine cashing section with an isogrid reinforcement structure on an external side thereof.

Referring to FIG. 1, a generally cylindrical engine casing section 10 has an isogrid reinforcement structure machined on its outer surface. The isogrid comprises a pattern of equilateral triangular shaped pocket recesses 12 which are divided by a series of upstanding ribs 14. The triangular shaped pockets are arranged in axially extending lines across substantially the whole surface of the casing section. The pockets are formed by removing material between the ribs by chip machining in accordance with the method of the present invention. The pockets have a minimum radial wall thickness of 0.45 mm and therefore the stiffness of the casing is provided substantially by the ribs 14 arranged in the isogrid structure. Further stiffness is provided by radial mounting flanges 16 and 18 at opposite axial ends of the casing.

The cylindrical casing of FIG. 1 has a slight taper in the axial direction and therefore has a frusto-conical shape. The casing may be machined from either a solid forging or may be fabricated from sheet material by welding. For gas turbine engine applications it is preferred that the casing is titanium although aluminium and alloys of titanium and aluminium may also be used depending on the structural requirements.

Figure 2:
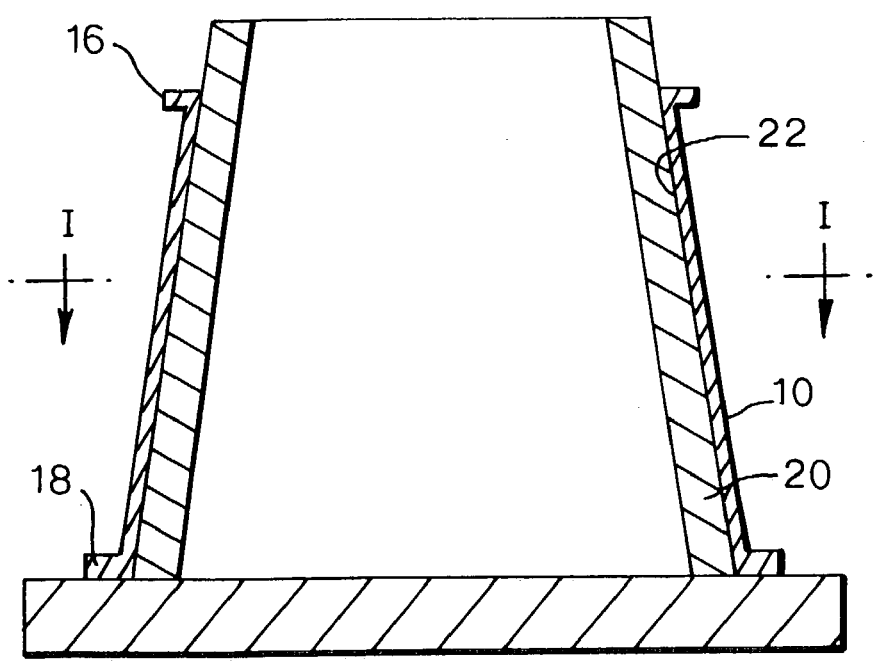
FIG. 2 is a cross-section view of a support and casing suitable for use in chip machining the isogrid reinforcement on the casing of FIG. 1.

In the method of manufacturing a thin wall isogrid aero engine casing by chip machining in accordance with the method of the present invention, the isogrid is formed by positioning the casing on a support. A support 20 suitable for machining the isogrid casing of FIG. 1 is shown in FIG. 2 with the casing mounted on the support. The support 20 has substantially the same shape as the casing 10 and has a radially outer support surface 22 which is substantially identical to the size and shape of the radially inner surface of the casing 10. This permits the casing to be mounted concentrically and coaxially on the support so that the inner surface of the casing engages the outer surface of the support over its entire surface area. The engagement between the casing and support may be one of interference or there may be a slight clearance to accommodate a filler material such as a curable resin as will be more particularly described with reference to FIG. 3. The support also has a frusto-conical shape so that the casing substantially encloses the support.

Figure 3:
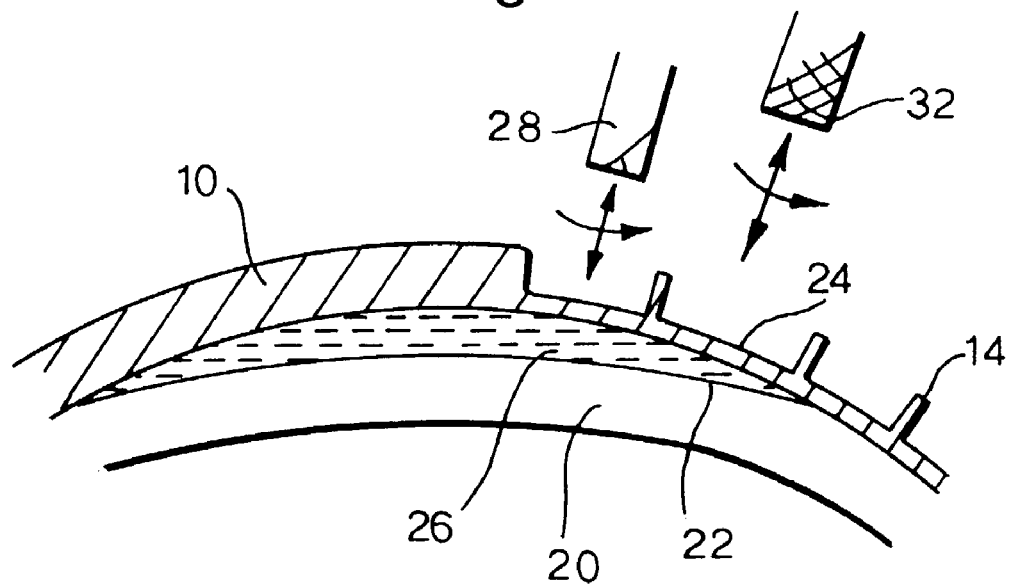
FIG. 3 is a detailed cross-section view along 1—1 in FIG. 2 of isogrid pockets machined on the outer surface of the casing of FIG. 1 with the casing mounted on the support.

Referring now to FIG. 3, slight differences in the geometrical shape of the support surface 22 and the casing can be accommodated by providing a filler material in the form of a curable resin 24, for example an epoxy resin on the surface of the support or the inner surface of the casing so that the non-cured resin fills any gaps, such as the gap 26, between the casing and the support surface 22. Such gaps may occur locally at the support and casing joint due to slight differences in the dimensions of the two adjoining components, for example due to the casing having a slightly oval cross section as a result of fabrication and machining tolerances. The non-cured resin may be injected into the region between the casing and support to fill the gaps 26, or the engaging surfaces of the support and casing may be coated before being joined together. The resin is cured before chip machining of the pockets takes place.

In a preferred embodiment of the present method a numerically controlled rotary cutting tool in the form of a drill 28 is first used to "rough out" the pockets on the outer side of the casing. The casing may have an initial radial wall thickness of 5.6 mm and the pockets may be initially drilled so that the wall thickness is reduced to 1.06 mm by the rotary drill cutter 28. During the spot drilling process the casing is supported over its entire area by the support 20 so that local distortions in the casing due to cutter induced loads do not occur. Once the pockets have been drilled they are finish machined by a second rotary cutter 30 in the form of an end mill having a 3 mm radius cutting edge so that a radius is formed between the thin wall skin sections of the pockets and the upstanding ribs 12. The end mill cutter can remove a further 0.5 mm from the pocket wall thickness so that the finish machined pocket has a wall thickness of 0.56 mm. The support 20 and filler material 24 where present supports the thin wall sections of the pockets during this final machining metal removal process.

Figure 4:
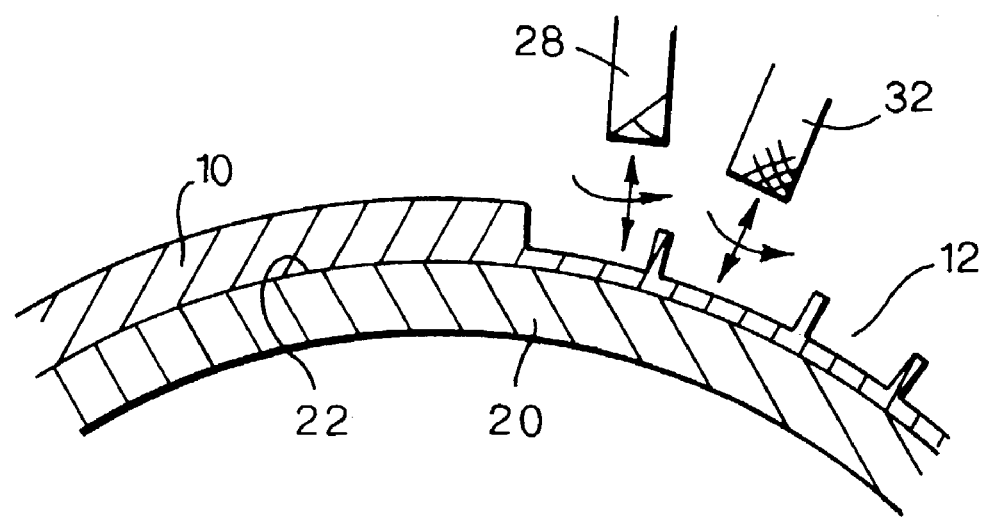
FIG. 4 is a cross-section view similar to that of FIG. 3 for a dimensionally accurate forged isogrid casing.

Referring to FIG. 4, where the casing 10 is a forging rather than a fabrication the inner surface of the casing can be machined by turning or other means to highly accurate dimensions such that the filler material 24 is not required.

In the method described adaptive machining is preferably employed to ensure the pockets are machined to the required dimensions. In one example the casing dimensions are measured by a probe, for example, an ultra sonic measurement probe, when the casing is mounted on the support. If the NC machine tool comprising the probe detects deviations in the dimensions of the casing the NC control programme for controlling the drill and mill cutters is adjusted accordingly and the pockets are then rough machined. One, or a sample or all pockets may be re-probed to check the dimensions of the rough machine pockets before final finish machining.

Although the invention has been described with reference to embodiments shown in the accompanying drawings it is to be understood that the invention is not so limited to those precise embodiments and that various changes and modifications may be effected without further inventive skill and effort. For example, the isogrid reinforcement may be machined on an interior surface of the casing with the support positioned around the exterior of the casing. Other chip machining processes may be used to remove the material from the pockets including for example high speed grinding and the like.

What is claimed is:

1. A method of manufacturing a thin wall isogrid casing by a chip machining process, the method comprising:

positioning a substantially cylindrical casing on a support, the support having a substantially continuous cylindrical support surface engaging substantially the whole of the inner or outer surface of the casing; and machining a plurality of recessed pockets in the inner or outer surface of the casing opposite the surface engaged by the support, whereby the support reacts loads acting on the casing by the chip machining tool during machining to minimise distortion of the casing and tearing of the pockets being formed, wherein the pockets are machined by at least one of an NC controlled milling cutter and spot drill.

2. The method as claimed in claim 1, further comprising: introducing a filler material between the casing and the support surface.

3. The method as claimed in claim 2, wherein the filler material is a curable resin.

4. The method as claimed in claim 3, wherein the resin is injected between the casing and the support.

5. The method as claimed in claim 1, wherein the casing is a fabricated frusto-conical casing.

6. The method as claimed in claim 1, wherein the casing is a forged frusto-conical casing.

7. The method as claimed in claim 1, wherein the casing is machined on its radially outer surface and supported by the support on its radially inner surface.

8. The method as claimed in claim 1, wherein the pockets are machined to have a radial thickness of less than 1 mm.

9. The method as claimed in claim 8, wherein the pockets are machined to have a radial thickness substantially in the range 0.45 mm to 0.85 mm.

10. The method as claimed in claim 1, wherein the pockets are first machined by spot drilling and then by mill cutting.

11. The method as claimed in claim 1, further comprising:
determining dimensional distortions in the casing before machining the pockets; and
adjusting positional control parameters of the NC controlled cutter or drill in accordance with the measured distortions.

12. The method as claimed in claim 1, further comprising:
inspecting the dimensions of the pockets during machining.

13. A method of manufacturing a thin wall isogrid casing by a chip machining process, the method comprising:
positioning a substantially cylindrical casing on a support, the support having a substantially continuous cylindrical support surface engaging at least part of the inner or outer surface of the casing;
machining a plurality of recessed pockets in the inner or outer surface of the casing opposite the surface engaged by the support, whereby the support reacts loads acting on the casing by the chip machining tool during machining to minimise distortion of the casing and tearing of the pockets being formed; and
introducing a filler material between the casing and the support surface.

* * * * *